INVENTOR.
NORMAN R. SEAMAN
BY Hamilton & Cook
ATTORNEYS

United States Patent Office 3,402,089
Patented Sept. 17, 1968

3,402,089
METHOD AND APPARATUS FOR WELDING FABRIC WITH A THERMOPLASTIC SEAM
Norman R. Seaman, Holmesville, Ohio, assignor to Domestic Film Products Corporation, Millersburg, Ohio, a corporation of Ohio
Filed Aug. 24, 1964, Ser. No. 391,614
12 Claims. (Cl. 156—282)

ABSTRACT OF THE DISCLOSURE

A machine for welding sheet material consisting of two opposed gripping surfaces carried on a movable frame, each gripping surface being driven at selectively independent speeds and the frame being movable at a speed coordinating with one of the gripping surfaces. The gripping surfaces can be moved toward and away from each other to form a controlled nip with a bight at at least one end thereof. At least one heat gun is selectively directed to emit hot air into the bight. To weld fabric on this machine one positions the fabric in overlapped relation within the nip and directs a hot air blast toward the bight formed between the two layers of sheet material as they enter the nip. The hot air forms a puddle of thermoplastic material and the operator causes the frame to move with respect to the sheet material such that the layers are forced into contact throughout the nip. The puddled material falls below the fluxing temperature within the nip and thereby welds the sheet material together. Registry of the sheets is asssured by the selective speed control of the gripping surfaces forming the nip.

The present device relates generally to sealing devices. More particularly, the present invention relates to devices for heat sealing, or welding, fabric by a thermoplastic bond. Specifically, the present invention relates to a device for continuously welding fabrics by heating the thermoplastic welding material with a jet of hot air.

Heat sealing to join thermoplastic coated materials is not per se new. Several methods and apparatus have heretofore been employed, but each has specific drawbacks. The three most widely known sealing methods can be categorized as being by "electronic" (or "impulse") welding, by "dielectric" heating or by "contact" heating.

Impulse welding is performed by an electronic device which directs an electron bombardment against and through the material being welded. To provide such an electron emission extremely high voltages are required, the electrons heating the material at the point of impact so that the fabric is electronically stitched along the seam. Impulse welding is quite expensive, requires a skilled technician to operate, subjects those in close proximity to the electron gun to severe radiation, and requires the use of complex high voltage rectification equipment, which poses personnel safety problems.

The dielectric welding apparatus grips the layers of fabric to be welded together between an opposed table and die. The table and die form opposed plates of a capacitance device with the fabric forming the dielectric insulation therebetween. By the use of normal voltages having radio frequencies the Maxwell stresses in the dielectric fabric material cause it to become heated, and this heat welds the fabric layers by bonding together the thermoplastic coatings of the adjacent layers of fabric. Such dielectric devices do not expose the operator to the radiation incident to impulse devices, do not require the skilled technicians to operate and do not require higher than normal voltages; however, they are expensive and do have other undesirable features.

For example, the dielectric devices can only form a seam at each welding operation which is equivalent to, and thus limited by, the contact area of the die. The standard size would be about two by forty-eight inches. For continuous seams of a dimension longer than that of the die, the fabric must be meticulously arranged each time between the die and the table with some overlapping of the preceding weld. This is an inefficient and time consuming operation.

In addition to these obvious drawbacks to the dielectric type welding equipment there are other detrimental aspects which are often entirely overlooked, Specifically, the machine is quite subject to short circuiting. Two major causes of short circuiting are contamination of the fabric and heat distortion of the die. The fabric can be contaminated merely by a pencil mark, the graphite in the lead of which provides a conductor between the die and table—eliminating the necessary capacitance effect therebetween required to weld the materials. Moreover, such a short would burn the material at the contaminatd points and pit either the die or table or both. The resulting short circuit could also damage the electrical circuitry of the device itself.

Similarly, heat distortion, or warping, of the die occurs after the dielectric machine has been in use for any extended period of time, so that if the fabric being joined is relatively thin it will not be able to absorb the dimensional differential between the die and table along the length of the die, causing a break-through in the material and direct contact between the die and table. This gives rise to the same damage possibilities discussed above in regard to the contamination of the fabric.

Additionally, it must be remembered than if the fabric is hygroscopic the dielectric heating device will instantly bring the moisture entrained in the fibers of the fabric to a boil, and this can completely prevent a satisfactory bonding of the fabric layers.

A further drawback attendant upon the warpage of the die, even if the material is of sufficient thickness to absorb the aforementioned dimensional differential, is that the heat applied is a function of the dimension between the die and the table for any given frequency. Hence, warpage of the die at the very least provides a welded seam of uneven strength.

Moreover, various thermoplastic bonding materials are responsive in varying degrees to any given frequency so that the frequency of the dielectric welding device would have to be changed for each bonding material.

Then too, many fillers may be added to the bonding material both for color and to provide fire resistance. Experience has shown that the addition of these fillers reduces the response of the bonding material to the radio frequencies used in dielectric welding.

Contact welding machines are known to operate in one of two ways.

One form of contact machine also utilizes opposed gripping plates, or platens. One or both of these platens are heated, with the fabric to be welded pressed therebetween, either before, after or during the time that the platens are being heated. The heat of the platens is imparted to the fabric by conduction which in turn heats the thermoplastic coating of the fabric to effect the weld. With a contact heater of this type the obvious detriment lies in the fact that the entire thickness of the fabric must be heated before the contacting surfaces of the overlapping layers of fabric become heated sufficiently to weld. This can cause structural damage to the fabric material itself as well as shrinkage, or distortion, along the seam. This form of contact welding machine, similarly to the dielectric and impulse machines, does not provide seams of consistent weld if the layer thicknesses are not themselves absolutely consistent. Such inconsistency, for example, can occur when welding across a previous seam.

A second form of contact welding machine utilizes a contact bar, or shoe, which slides along the surfaces to be joined, heating those surfaces. This type welding machine, because of the generally momentary contact of the shoe with the fabric, requires that the shoe be heated to a rather high temperature. The high temperature of the shoe often burns the surface of the fabric, depositing a cinder like material which is retained in the weld and weakens the seam. Not only does the high temperature occasionally burn the bonding material but it often brings the plasticizer in the thermoplastic bonding material to a boil. This vaporization of the volatile plasticizer in the seam causes a spongy and weak weld.

It is therefore an object of the present invention to provide a machine for welding fabric with a thermoplastic bonding material which is capable of making a consistently strong seam.

It is another object of the present invention to provide a welding machine, as above, which controllably heats the thermoplastic bonding material without having the heating element come in contact therewith and which does not therefore overheat the fabric itself.

It is yet another object of the present invention to provide a welding machine, as above, which maintains the seam together under pressure until the thermoplastic bonding material has cooled sufficiently to provide a strong seam.

It is still another object of the present invention to provide a welding machine, as above, which will join fabrics irrespective of their relative thickness or the consistency of their thickness and which will join only selective layers when multiple layers of fabric are passed therethrough.

It is a further object of the present invention to provide a welding machine, as above, which is capable of producing an output, in lineal dimension of completed seam, far in excess of any known seam welding device.

It is a still further object of the present invention to provide a welding machine, as above, the operation of which is unaffected by the inclusion of fillers added for color or flame resistance.

It is an even further object of the present invention to provide a welding machine, as above, which is relatively inexpensive to manufacture and maintain and which can be effectively operated by relatively unskilled operators.

These and other objects which will become apparent from the following specification are accomplished by means hereinafter described and claimed.

One preferred embodiment is shown by way of example in the accompanying drawings and described in detail without attempting to show all of the various forms and modifications in which the invention might be embodied; the invention being measured by the appended claims and not by the details of the specification.

GENERAL DESCRIPTION

In general, a welding machine according to the concept of the present invention has a selectively movable frame. An endless belt is mounted for rotation on the frame and is driven by a first power means which is also operatively connected to move the frame. The connection between the endless belt and the first power drive means is such that the surface speed of the belt can be coordinated with the lineal movement of the frame.

A control drum is also carried on the frame in opposition to said belt and is movable selectively toward and away from said belt means respectively to grip and release fabric therebetween. A second power drive means rotates said control drum and is controlled by a means to regulate the surface speed of the control drum with respect to the surface speed of the belt means—that is, the control drum is rotatable at the same speed, at a higher speed, or at a lesser speed than the belt means.

When the control drum is moved toward said belt means, the belt forms an extended nip around a portion of the periphery of said control drum with a bight at one end. At least one air gun is mounted on the frame in such a way as selectively to supply heated air into the bight.

THE MOVABLE FRAME

Referring more particularly to the drawings, an apparatus for welding fabric with a thermoplastic bonding material is designated by the numeral 10. The frame of the apparatus 10 is of a generally clevis-shape having a horizontal base member 11 one end of which is secured to a vertical, or upright, side member 12 which in turn supports a cantilevered upper, or bridging, member 13.

A main drive shaft 14 is journaled in the base member 11 and carries a pair of drive wheels 15 and 16, one non-rotatably mounted at each end thereof. These drive wheels 15 and 16 are received on parallel track means 18 and 19 along which the welding apparatus may be moved transversely the plane of the clevis-shaped frame.

A stabilizer beam 20 is fixed perpendicularly to the upright side member 12 and extends outwardly in each direction from the frame above the track 19. The stabilizer beam 20 may be further rigidly secured to the frame by an A-frame type brace 21. Rotatably mounted on the outer ends of the stabilizer beam 20 are a pair of bogie wheels 22 and 23 also engaging the track 19.

A stanchion 24 extends upwardly from the base member 11 in proximity to the end thereof opposite the upright member 12. The stanchion 24 is inclined forwardly at approximately 15° from a true vertical and carries a seat bracket 25 which extends forwardly thereof to mount a seat 26, preferably vertically adjustable by a threaded shaft 28 and two opposed lock nuts 29 and 30.

A first power drive means in the form of a motor 31 rests on a platform 32 extending outwardly from the upright frame member 12 oppositely the bridging member 13. The power take off of motor 31 is attached to a suitable gear reducer 33 from which a chain drive 34 extends to power the main drive shaft 14. A clutch 35 is interposed between the chain drive 34 and the main drive shaft 14. This clutch 35 may either be of the well-known magnetic or mechanical varieties and readily operative by the operator when seated on seat 26.

THE FABRIC GRIPPING MEANS

Also extending outwardly from the gear reducer 33 is a secondary drive shaft 36. This secondary drive shaft 36 is journaled longitudinally through the lower portion of the bridging member 13 and drives a first pulley 38 nonrotatably keyed thereon. The first pulley 38 is positioned adjacent the outermost journal 39 on the end of the bridging member 13 and lies in a vertical plane which includes the stanchion 24. A link arm 40 extends rearwardly and downwardly from the bridging member 13 on which it is pivotally mounted for oscillation in a vertical plane and carries a second pulley 41 on the outer end thereof. The first and second pulleys 38 and 41, respectively, are aligned to receive an endless belt 42 for rotation thereon. A pair of guide rollers 43 and 44 are carried on a flange 45 which extends laterally outwardly from the link arm 40 to impart lateral stability to the belt 42.

A clevis 46 is pivotally attached to the medial portion of link arm 40, as by a pin 48 and carries a threaded shaft 49 which extends upwardly through a bore 50 in the support flange 51 in which it is slidably received. A position adjusting nut, as for example the wing nut 52 shown, is threadably received on the shaft 49 upwardly of the flange 51. By selectively locating the positioning nut 52 the vertical position of the second pulley 41 can be initially set.

Encircling the shaft 49 and beneath the support flange 51 is a helical compression spring 53. The spring 53 acts between the fixed support flange 51 and a pressure adjusting nut 54 threaded onto the shaft 49 between the clevis 46 and the flange 51. Once the initial position of the second pulley 41 has been selected, the adjusting nut 54 is positioned toward or away from the flange 51 to increase or decrease, respectively, the pressure exerted by the spring 53 to hold the second pulley 41 in its initially selected position.

Mounted on stanchion 24 in opposition to the belt 42 is a control drum 55. The control drum 55 is rotatably mounted in a fork 56 supported on the end of a piston rod 58. The other end of the piston rod 58 is attached to a piston 59 (FIG. 4) operated by a cylinder 60 pivotally mounted on the stanchion 24, as by pin 61.

One end of a radius rod 62 is hinged to the fork 56, as at the journal 63 in which the control drum 55 rotates, and the other end is swingably mounted on the stanchion 24, as on the idler shaft 64. The radius rod 62 assures that when the cylinder 60 is actuated to raise the control drum 55 the drum will move along the arc defined by the rod 62 as it swings about its pivotal connection to the stanchion 24 and into engagement with that portion of the belt 42 medially of the first and second pulleys 38 and 41, respectively.

Figure 5:
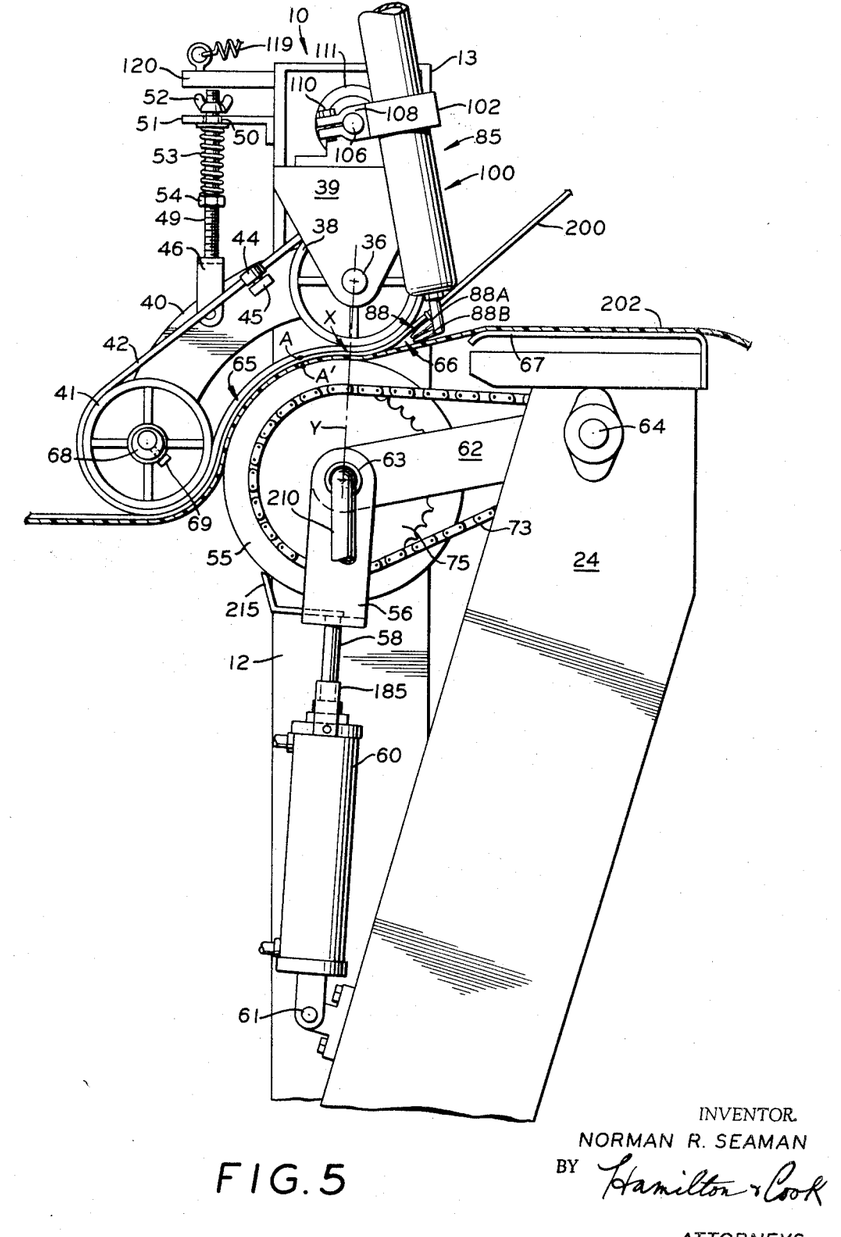
FIG. 5 is a view similar to FIG. 4 with the fabric gripping means engaged with two layers of fabric therebetween and with the heating tip in operative position.

As best shown in FIG. 5, an extended nip 65 is formed by the belt 42 around a portion of the periphery of said control drum 55 and terminates in a bight 66 directly forwardly toward the guide plate 67 on the top of stanchion 24.

If the second pulley 41 is rotatablly mounted on an eccentric sleeve journal 68, as shown, it may be selectively rotated and locked, as by set screw 69, to vary the slack available in the belt 42. This, together with the position adjusting nut 52, will control the extent of the nip 65 available. Adjustment of nut 54 in coordination with pressure applied by drum 55, as is more fully hereinafter described, will control the biasing pressure with which this nip is maintained.

Rotation of the belt 42 is accomplished by the first power means 31, through the first pulley 38. Rotation of the control drum is accomplished by the use of a second power drive means, depicted as motor 70. To allow for the variable positioning of the control drum 55 by cylinder 60 to the power transmission means from the motor 70 to the drum 55 comprises a chain drive 71, or the like, from the motor 70 to a sprocket 72 on the idler shaft 64, and another chain 73 from a second sprocket 74 (FIG. 1) on the idler shaft 64 to a drive sprocket 75 nonrotatably attached to the drum 55.

The various connections between the power drive means 31 and 70 and the belt 42 and control drum 55, respectively, are so constructed that the surface speed of the belt 42 and the surface speed of the control drum 55 are normally equal. Thus, when these two components, belt 42 and drum 55, are in the engaged position depicted in FIG. 5, they will normally be in pure rolling contact. That is, any given point A on the control drum 55 will have the same angular velocity as the contacting point A' on belt 42 so that if the points A and A' come together at the bight 66 they will remain contiguous as they traverse the entire length of the extended nip 65. This normal equality of speed, is also coordinated with the lineal velocity of the apparatus 10 along the track means 18 and 19 to facilitate the welding of large pieces of fabric, as will be more fully hereinafter discussed.

However, it has been found that either the aforesaid surface speed of the belt 42 or the drum 55 must also be independently variable so that a controlled relative slip can be provided therebetween. That is, the relative angular velocity of either the belt or drum along the extended nip must be controllable so that as the points A and A' come into contact at the bight one or the other can be controlled to traverse the nip in lesser or greater time than the other.

In the preferred embodiment, a simultaneous regulation of the speed of both motors 31 and 70, as well as an independent regulation of the speed of motor 70, is provided.

This may be done in any one of many ways. For example, by the use of mechanical transmission means, AC motors have an eddy current clutch, AC-DC motors or variable slip AC motors. However, the preferred form of welding apparatus 10 utilizes a compound wound, constant torque, DC motor for both the first and second power drive means 31 and 70.

Figure 11:
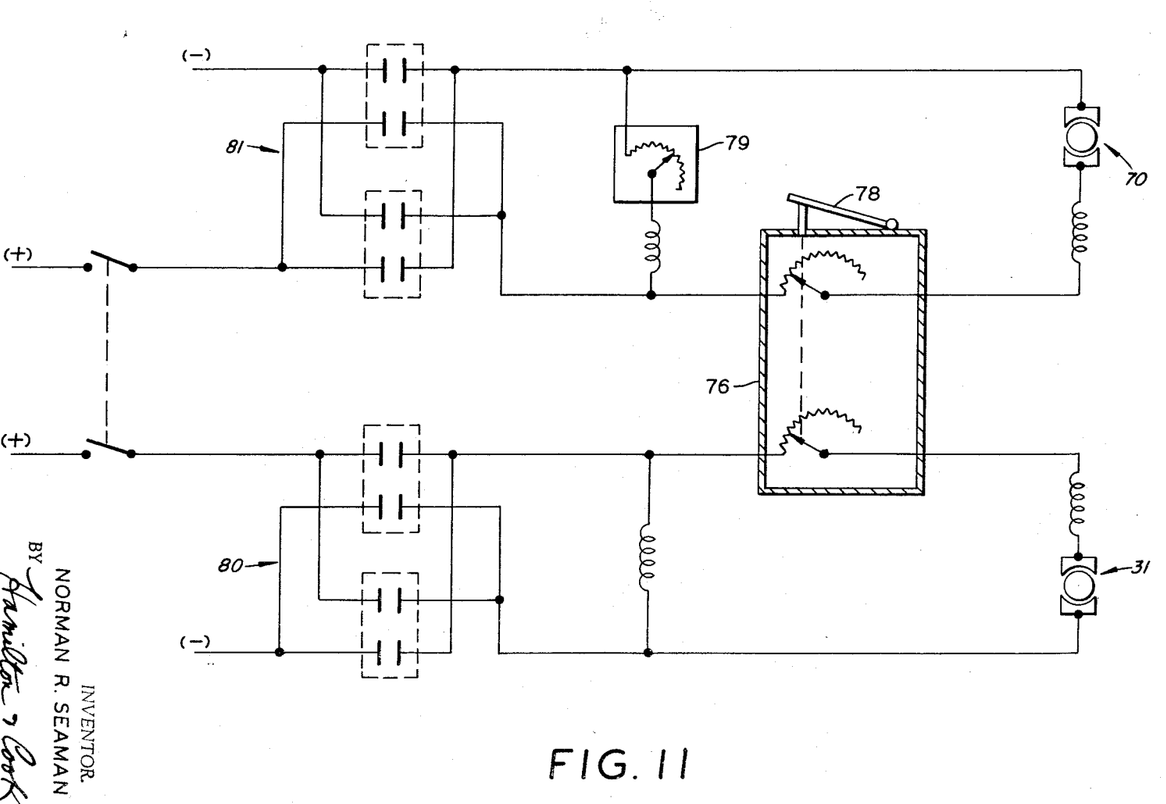
FIG. 11 is a schematic wiring diagram of the power drive means control.

In the schematic wiring diagram of FIG. 11, the two compound wound motors 31 and 70 are simultaneously controlled as to speed through an armature voltage control 76 operable by a foot pedal 78. The speed of motor 70 is, in addition, independently variable by the use of a manual field strength trim control 79. While the control 79 depicted gives quite satisfactory results, electronic or static control elements may be substituted if a greater range of speed adjustment is found desirable for a particular installation.

Standard polarity reversing switches 80 and 81 are provided for motors 31 and 70, respectively, to provide reversal of rotational direction. Of course, these may be ganged, if so desired. In addition, any of the standard braking devices, well-known in the art of DC motor controls, may be supplied to assure instant stopping which may be desirable for fine incremental control of the two power drive means motors.

HEAT GUNS

Tip

Figures 8, 9, 10:
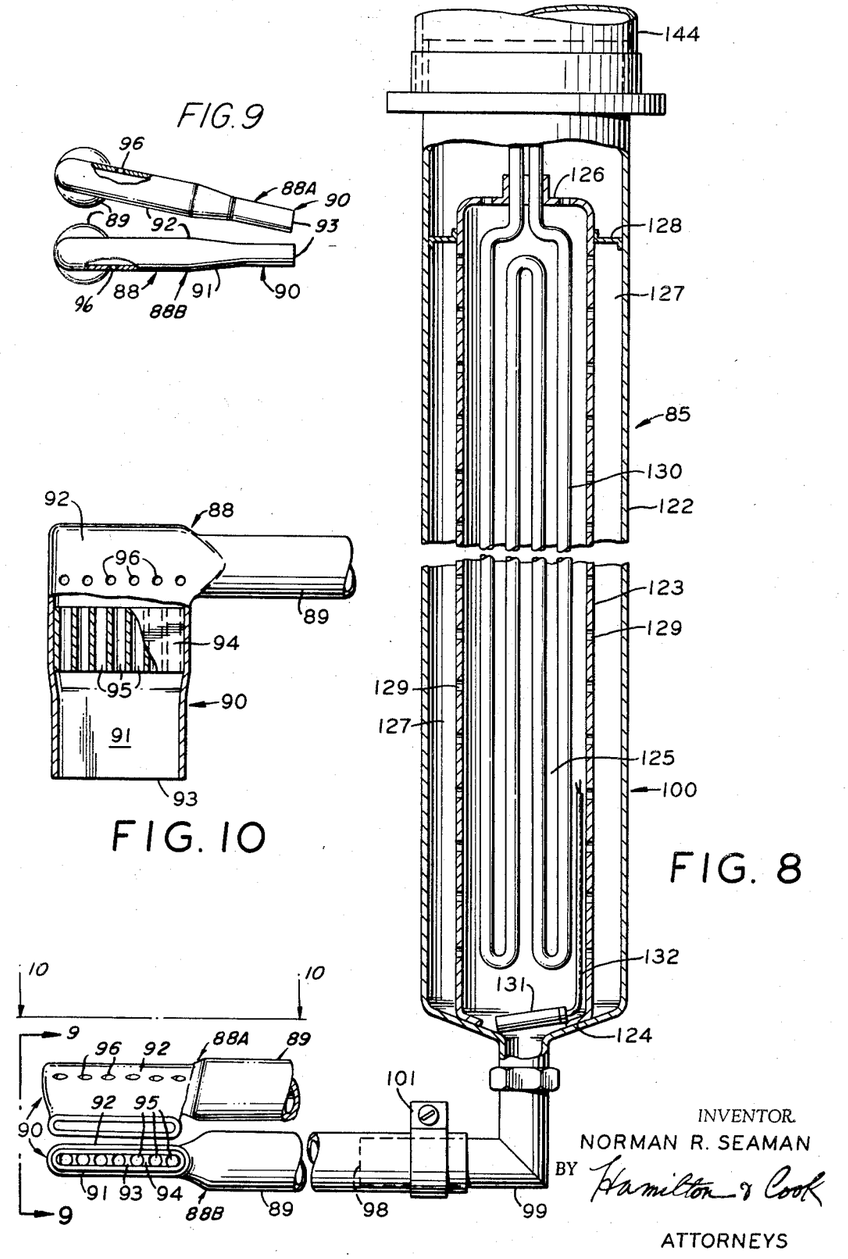
FIG. 8 is an enlarged cross section taken substantially on line 8—8 of FIG. 4.
FIG. 9 is an end elevation taken substantially on line 9—9 of FIG. 8.
FIG. 10 is a top plan partly broken away taken substantially on line 10—10 of FIG. 8.

While for some applications of the subject welding apparatus 10 it may be desirable to utilize only one heat gun, the preferred embodiment utilizes two guns, indicated generally by the numerals 85 and 86, each provided with a heating tip 88. The heating tips 88 themselves, when constructed as shown in FIGS. 8-10, have been found to produce the best results. The tips 88 each receives heated air through an intake conduit 89 from a suitable source, described hereafter under the section titled "Heating Chamber." This conduit 89 communicates with a barrel portion 90 having opposed, spaced apart, generally parallel, flat sides 91 and 92 and which extends laterally from one end of the intake conduit 89 and terminates in a slot 93 forming the muzzle.

A guide block 94 is fixedly positioned within the passage through the barrel portion 90 between the intake conduit 89 and the muzzle slot 93. A plurality of bores 95, as for example, the single row depicted, are provided through the block 94 in an orientation parallel to the axis of the barrel portion 90.

A plurality of prewarming orifices 96 are provided through at least one of the flat sides 91 or 92 between the intake conduit 89 and the guide block 94. The particular side 91, 92, or both, through which prewarming orifices 96 are provided will depend not only on the number of guns used but also on the material being welded or the type of weld, as hereinafter discussed in greater detail with respect to the operation of the apparatus. In the two gun embodiment disclosed, prewarming orifices 96 are directed upwardly through the flat side 92 of the barrel 90 in the upper gun, designated by the numeral 88A in FIGS. 5, 8 and 9, and similar prewarming orifices 96 are directed downwardly through the flat side 91 of the barrel 90 in the lower gun 88B.

The intake conduit 89 of each gun 85 and 86 is preferably selectively positionable along and about one leg 98 of an elbow conduit 99 attached to a heating chamber 100.

Once the tip 88 has been positioned on the leg 98 in the desired location it may be locked thereon, as by a hose type clamp 101.

Tip positioning

Because the heating chamber for each gun 85 and 86 is the same only one will be described. The two heating chambers 100 are carried by a support block 102 (FIGS. 6 and 7) in which they are selectively positionable axially of themselves. As shown, this is accomplished by providing a main bore 103 through the support block 102 of sufficient diameter so that each heating chamber 100 is axially slidable therein. Each heating chamber 100 may be maintained in selected position, as by a set screw 104 tightenable in a bore 105 which intersects the main bore 103.

This support block 102 is itself supported on the end of a piston rod 106 by a split sleeve 108. A pair of tightening nuts 109 and 110 are provided to tighten the split sleeve nonrotatably onto the end of the piston rod 106. It should be apparent that by manipulation of the immediately afore-described adjustable mounting means the barrel portion 90 of one or more tips 88 can be selectively directed and the muzzle 93 positioned in the proximity desired to the bight 66 where the belt 42 and control drum 55 come together.

Such selective orientation is accomplished when the piston rod 106 is retracted. Retraction and extension of the rod 106 is accomplished by a cylinder 111 supported in the bridging member 13 above the secondary drive shaft 36. Accordingly, the retraction of the rod 106 brings the gun tips 88 into operative position, and extension of the rod 106 moves the tips 88 laterally outwardly of their operative position to facilitate arrangement of the fabric prior welding or removing the fabric after welding.

In addition to this translation of the guns out of operative position it is also highly desirable to rotate them so that they are more completely clear of the fabric, both to further facilitate positioning thereof and to obviate possible damage thereto by accidental overexposure to the heat emanating from the tip.

Figure 6:
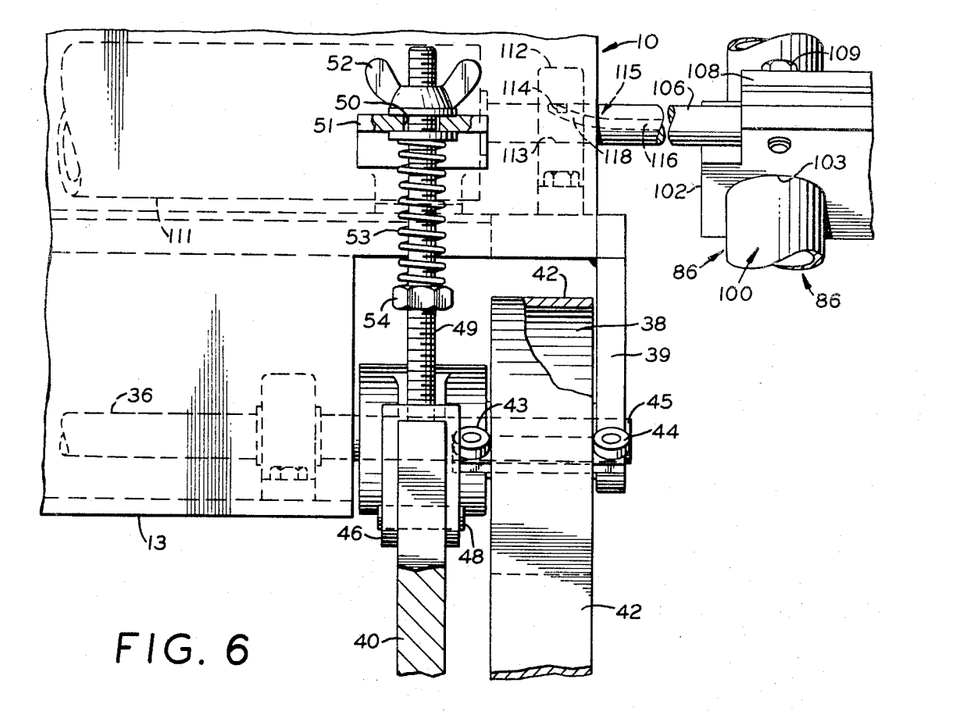
FIG. 6 is an enlarged partial rear elevation taken substantially on line 6—6 of FIG. 4.
Figure 7:
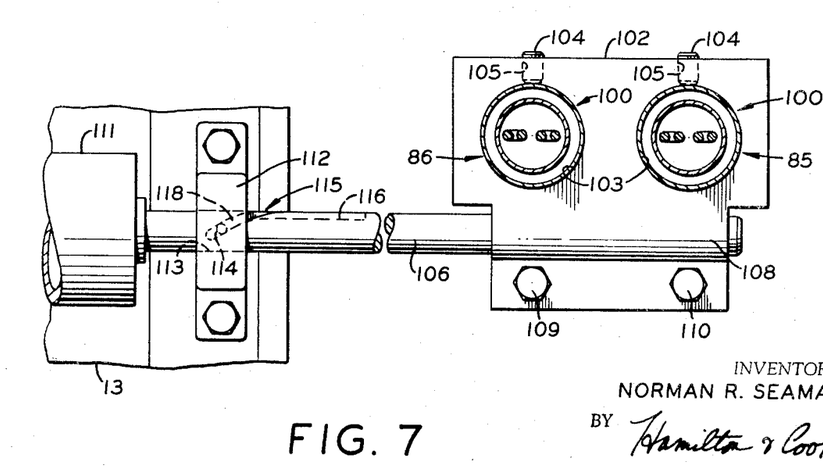
FIG. 7 is an enlarged cross section taken substantially on line 7—7 of FIG. 4.

This rotation can be readily accomplished by a camming mechanism. As shown in FIGS. 6 and 7 the rod 106 is slidably received in a bored collar 112 fixed to the interior of the bridging frame member 13. Extending radially inwardly of the bore 113 through which the rod 106 slides is a pin, or cam follower, 114 which is received in a raceway cam 115 recessed in the outer surface of the piston rod 106. By the particular disposition of the recessed cam 115 shown, the extension of the rod 106 will first translate the tips laterally outwardly from the bight 66 (as the pin 114 traverses the axial portion 116 of cam 115) and sequentially rotate rearwardly (as the pin traverses the helical portion 118 of cam 115). With the rotation of the tips 88 occurring near the end of the stroke of piston rod 106 an energy absorbing inertia spring 119 is provided, as between a mounting extension 120 on bridging portion 13 and a fastening means 121 above the pivotal axis of the rod 106 on the gun 85 or 86.

Heating chamber

Any construction for the heating chamber 100 which is capable of providing heated air through the tips 88 in sufficient quantities would be satisfactory. However, one construction which works quite well is depicted in FIG. 8. This preferred heating chamber 100 has a first outer cylindrical shell 122 and a second cylindrical shell 123 spaced inwardly and preferably concentrically thereof. The lower ends of shells 122 and 123 are joined, as at 124, with the compartment 125 formed interiorly of shell 123 communicating with the elbow conduit 99. The inner shell 123 has a top 126 to close it off from the compartment 127 formed in the space between the outer and inner shells. For stability, one or more braces 128 should be provided between the outer and inner shells 122 and 123. However, these braces must be so placed as not to overly obstruct the flow of air through the compartment 127.

A plurality of openings 129 are provided through the inner shell 123. These openings 129 permit air in compartment 127 to flow through the inner shell 123 and into contact with an electric heating element 130 fixed in the interior of compartment 125. By use of the dual shell arrangement, the air is forced into a completely turbulent flow in compartment 125 and is more uniformly heated.

A thermocouple 131 is positioned in the throat between the compartment 125 and the elbow conduit 99 which measures the temperature of the heated air passing out of the chamber 100 and, by wire 132 relays this information to an appropriate gauge visible to the operator. In the embodiment of the welding apparatus depicted, a thermocouple is provided in each gun 85 and 86 which is wired to its respective pyrometer 133 and 134 mounted on the bridging member 13.

Figure 12:
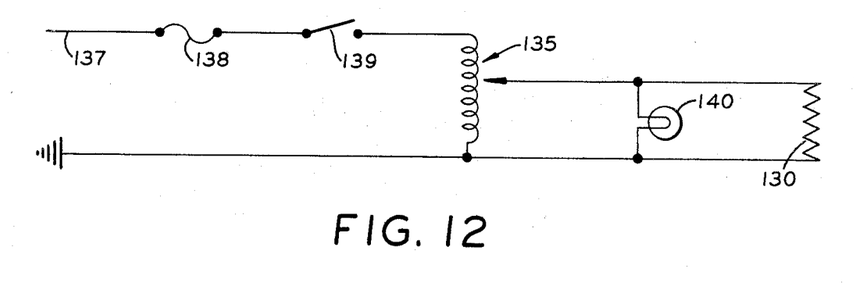
FIG. 12 is a wiring diagram for the heating element control circuit.

The electrical heating element 130 used by each gun 85 and 86 is wired to a power source through its respective powerstat 135 and 136 (FIG. 1) to provide separate heating control of the air emanating from each chamber 100. A typical wiring diagram for such a heating arrangement is shown in FIG. 12. The hot line 137 feeds through a fuse 138 and switch 139 to the input side of the powerstat 135 (or 136). The powerstat, one side of an indicator light 140, and one side of the heating element 130 are connected to ground. The other side of the indicator light 140 and the heating element 130 are connected to the output side of the powerstat. The switch 139 may be conveniently mounted on the bridging member 13 (FIG. 1) for control of gun 85, and a similar switch 139A mounted adjacent thereto for controlling gun 86.

Figure 1:
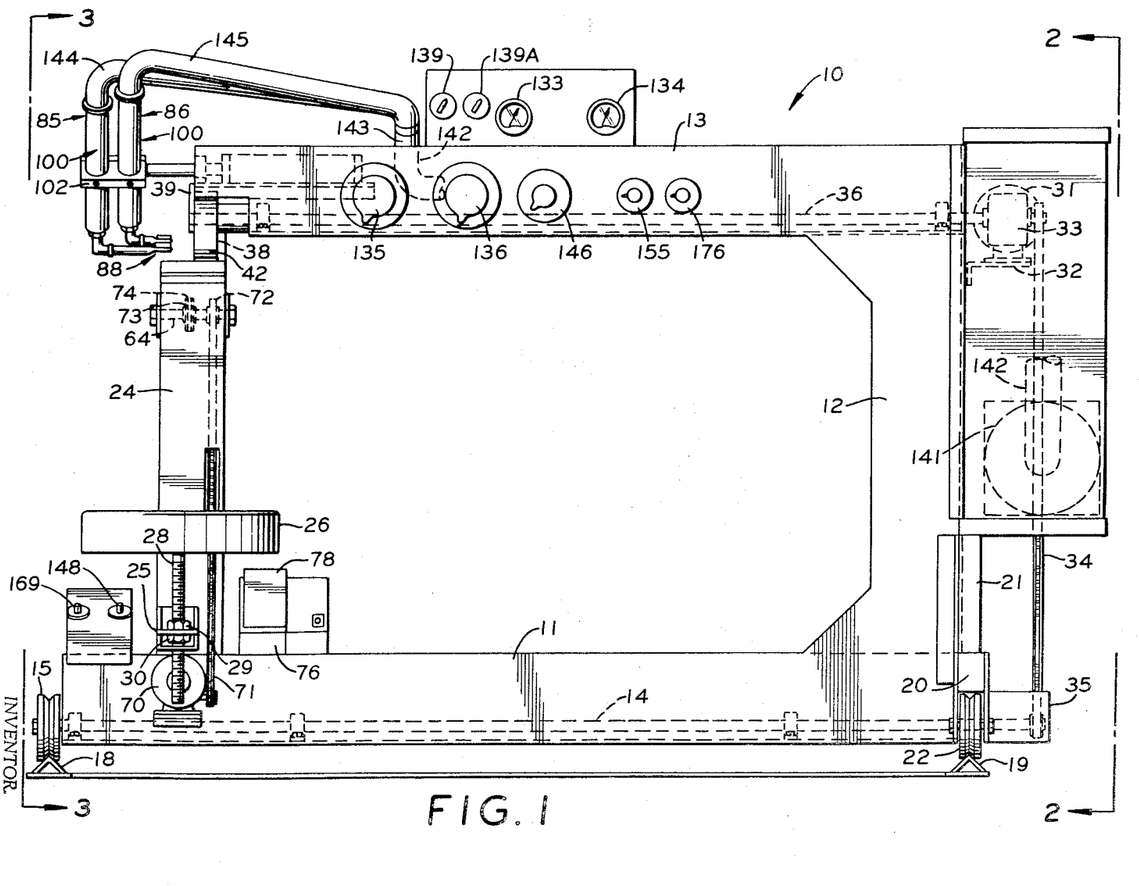
FIG. 1 is a frontal elevation of a welding apparatus according to the concept of the present invention.
Figure 2:
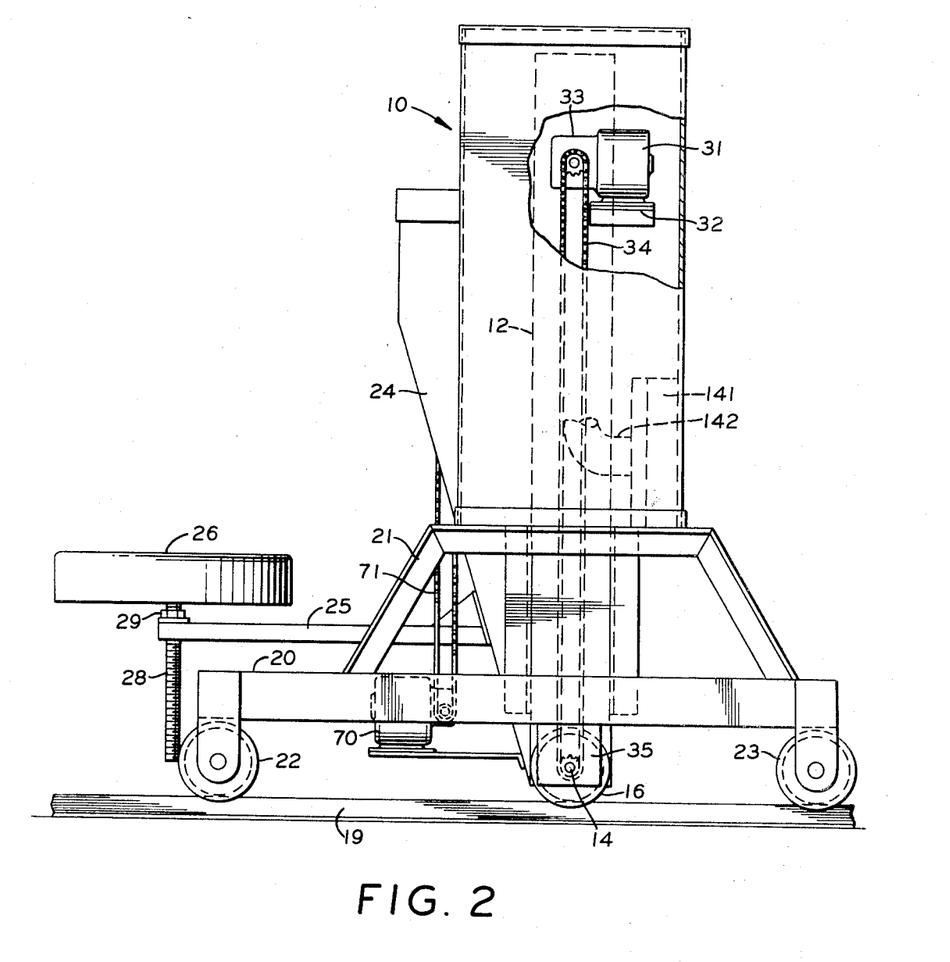
FIG. 2 is a side elevation taken subtantially on line 2—2 of FIG. 1.

A further control of the heating capacity is supplied by the provision of a selectively variable air supply. It has been found sufficient if the heating chambers 100 of both guns 85 and 86 are supplied by a common blower 141. As shown in FIGS. 1 and 2 the blower 141 may be carried on a supporting platform extending outwardly from the upright member 12. A conduit 142 leads from the blower 141 to a point along the bridging member 13 in proximity to the guns 85 and 86.

Figure 3:
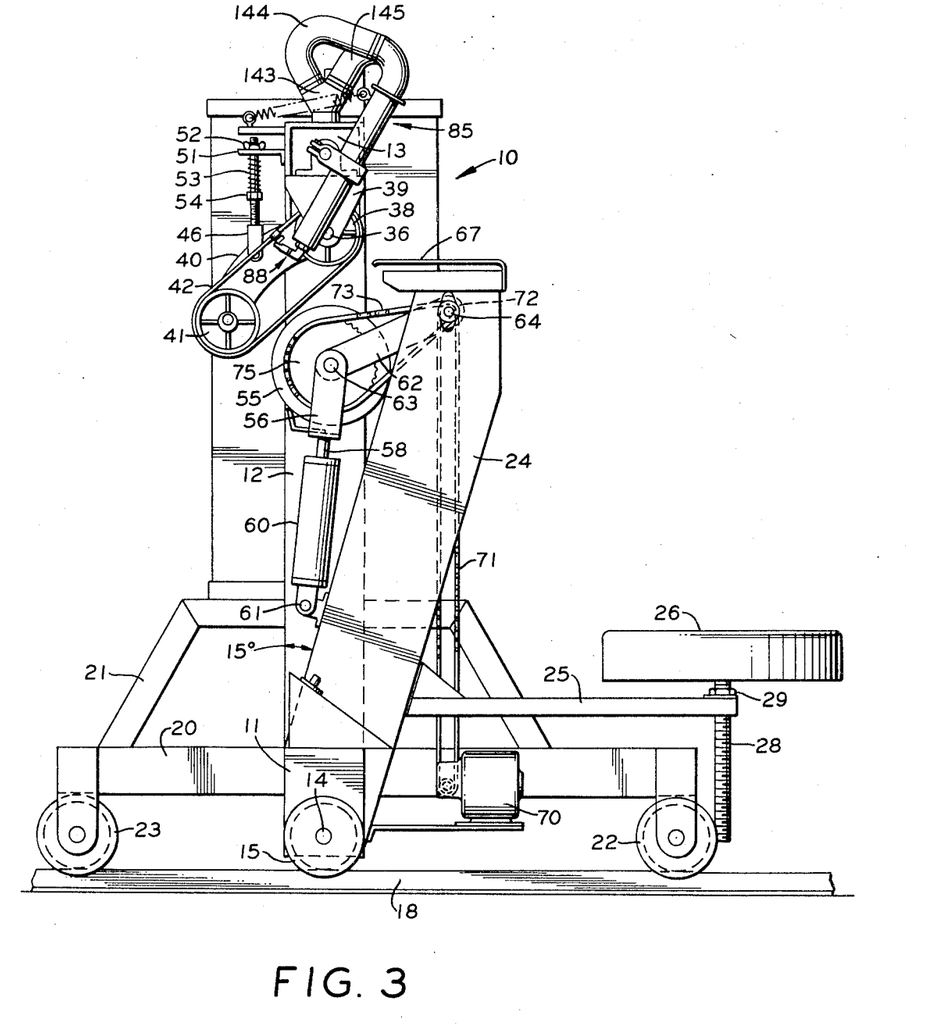
FIG. 3 is a side elevation taken substantially on line 3—3 of FIG. 1.
Figure 4:
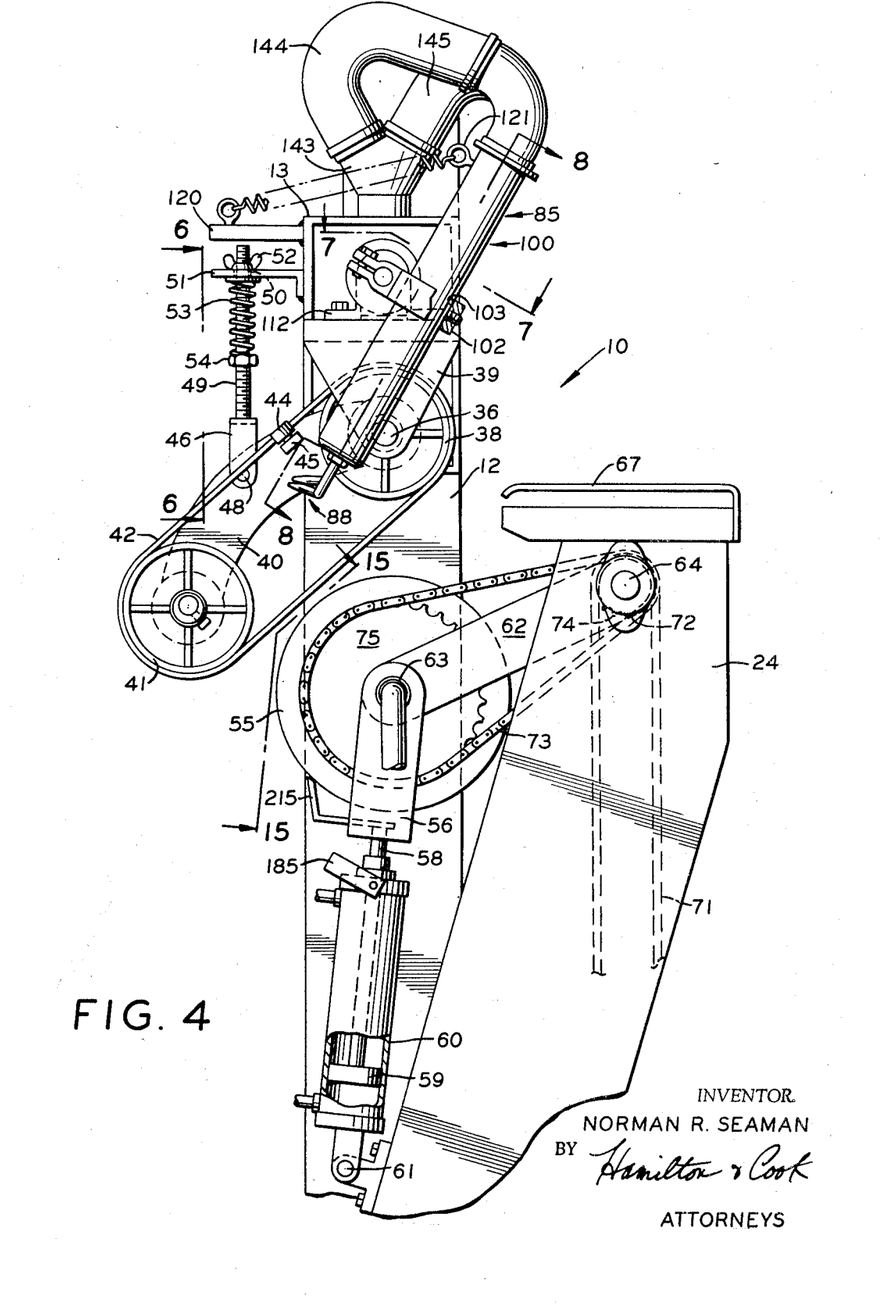
FIG. 4 is an enlarged area of FIG. 3.

In order to accommodate the controlled movement of the guns 85 and 86, as by the extension and retraction of piston rod 106, a flexible conduit connects the conduit 142 with each heating chamber. As best seen in FIGS. 1, 3 and 4, the conduit 142 terminates in a Y connection 143 with a flexible conduit 144 communicating from one branch of the Y to gun 85, and a second flexible conduit 145 communicating from the other branch of the Y gun 86.

The output of the blower 141 is regulated by a powerstat 146 (FIG. 1) wired in a similar fashion to the heating element shown in FIG. 12 so that the operator may vary the volumetric output of the guns as well as the temperature output to suit the needs of the particular fabric being welded.

ELECTRO-PNEUMATIC GUN POSITIONING ACTUATOR

As discussed above with respect to the tip positioning, the extension and retraction of piston rod 106 moves the tip into and out of operative position with respect to the bight 66.

As shown in FIG. 1 a foot operated electrical switch 148 is used to actuate the mechanism by which the guns are selectively moved into and out of operative position. While any number of electro-mechanical servo-mechanisms may be utilized to accomplish this purpose, the preferred form utilizes a valve 149 operated by opposed solenoids 150 and 151, as shown in the schematic representation of FIG. 13. A spool-like shuttle 152 is reciprocably slidable in a valve housing 153 by the opposed solenoids 150 and 151.

Figure 13:
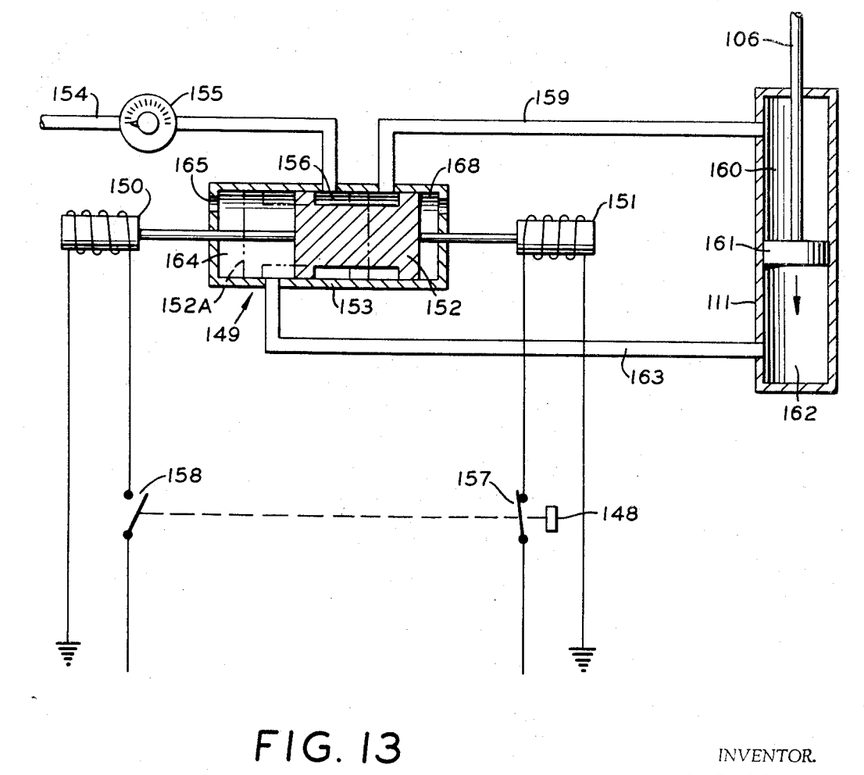
FIG. 13 is a schematic wiring and piping diagram for the heating tip actuator.

Pneumatic pressure is supplied in line 154 from a supply source, through a pressure regulator 155 into the pressure chamber 156 formed around the spool-like shuttle 152. With the switch 148 actuated, as shown, to close the contacts 157 and open the contacts 158, thus activating solenoid 151 and deactivating solenoid 150, the shuttle 152 is moved to connect the pressure line 154 with the feed line 159 communicating with the work chamber 160 on that side of the piston 161 in cylinder 111 to retract the piston rod 106. As the piston 161 moves in the direction of the arrow, the air in chamber 162 flows through feed line 163 into the exhaust chamber 164 of valve 149 and then to atmosphere through port 165.

To extend the piston rod 106 the switch 148 is actuated to open contacts 157 and close contacts 158. This activates solenoid 150 and deactivates solenoid 151 so that the shuttle is reversely reciprocated to the phantom position 152A. When the shuttle 152 has thus been reciprocated by the action of solenoid 150, the pressure line 154 communicates with feed line 163, and the feed line 159 communicates with the exhaust chamber 168. Accordingly, the piston 161 is moved oppositely the direction indicated by the arrow, and the rod 106 is extended.

Of course, by regulating the pressure in the pressure line 154 with regulator 155 both the speed and force with which the rod 106 is extended and retracted can be controlled. For convenience to the operator the regular 155 is positioned on the bridging frame member 13 (FIG. 1).

ELECTRO-PNEUMATIC CONTROL DRUM POSITIONER

Figure 14:
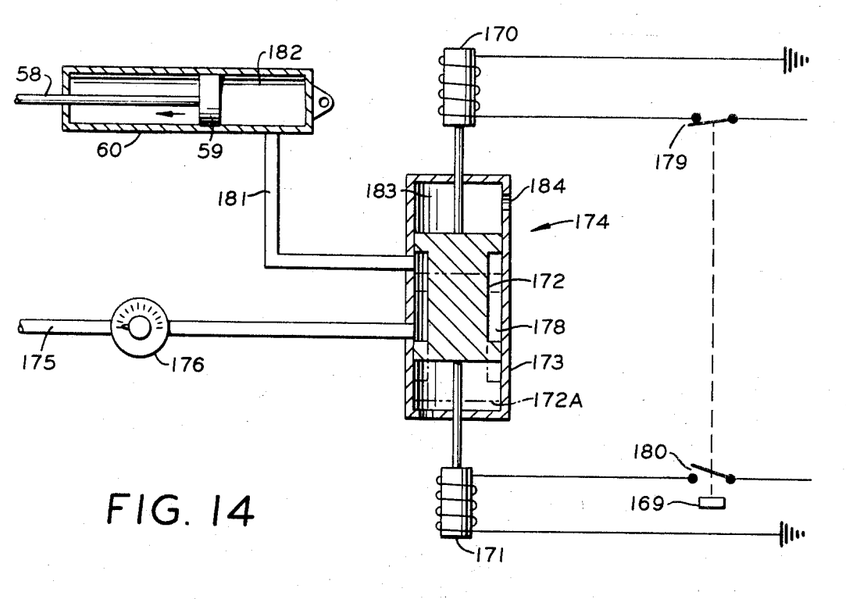
FIG. 14 is a view similar to FIG. 13 for the control drum actuator.

The control drum 55 may be actuated by a servo-mechanism similar to that utilized to actuate the gun position. Such a servo-mechanism, suitable for the positioning of control drum 55, is schematically represented in FIG. 14.

A foot operated electrical switch 169 is mounted adjacent the switch 148 (FIG. 1) on the frame of the welding apparatus 10. This switch 169 selectively controls two opposed solenoids 170 and 171 to reciprocate the spool-like shuttle 172 in the housing 173 of valve 174.

Pneumatic pressure is supplied by line 175, through a regulator 176, into the pressure chamber 178 formed around the spindle-like shuttle 172. When, as depicted, the switch 169 is actuated so that contacts 179 are closed and contacts 180 are open, the solenoid 170 is activated so that the shuttle 172 is positioned with the feed line 181 communicating between the pressure chamber 178 in the valve 174 and the work chamber 182 on that side of the piston 59 in cylinder 60 to extend the piston rod 58 in the direction of the arrow and move the control drum 55 toward the belt 42.

The regulator 176 which is also positioned within ready access of the operator, as on the bridging frame member 13 (FIG. 1), can control the pressure with which the drum 55 is forced against the belt 42. This pressure, together with the opposing pressure exerted by spring 53 to hold the second pulley 41 in its selected position, controls the pressure by which the fabric is held in the nip 65.

To move the control drum 55 away from the belt 42 the switch 169 is operated so that the contacts 180 close and the contacts 179 open. This activates the solenoid 171 and deactivates solenoid 170 so that the shuttle 172 moves to the phantom position 172A. With the shuttle 172 thus reciprocated by solenoid 171, the feed line 181 communicates the work chamber 182 in cylinder 60 with the discharge chamber 183 of valve 174 which exhausts to atmosphere through port 184. The weight of the piston 59 and the generally vertically oriented rod 58 which supports the control drum 55 lowers the drum.

While the full retraction stroke of the control drum 55 may at times be necessary, it is generally satisfactory if the drum can back away from the belt 42 sufficiently to relieve the nip pressure therebetween to allow adjustment of the fabric. For this purpose a selectively positionable swing leg 185 carried on the top of cylinder 60 may be pivoted inwardly beneath the fork 56 to limit the downward stroke of the piston rod 58 when desired.

OPERATION

The subject welding apparatus is extremely versatile, and the description of its utilization in welding together two large pieces of fabric well exemplifies its usefulness.

Figure 16:
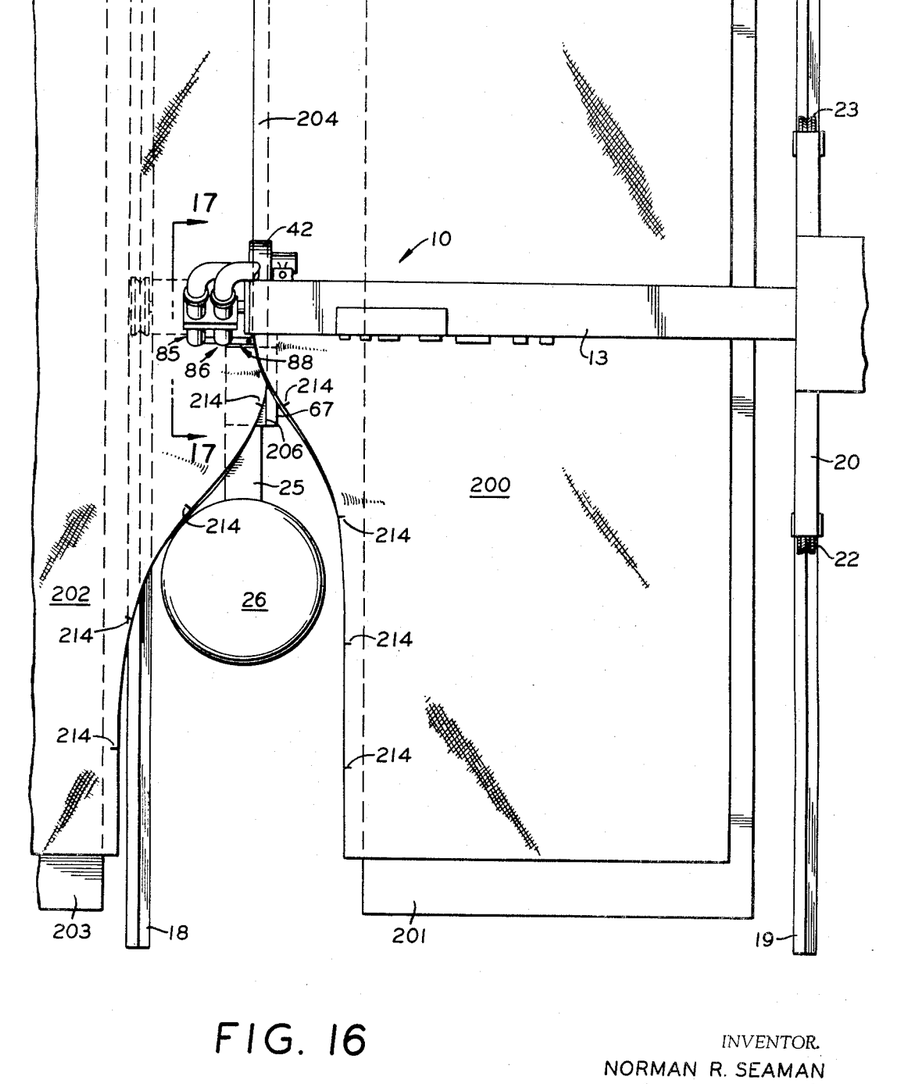
FIG. 16 is a top plan view schematically depicting a welding apparatus constructed according to the concept of the present invention joining together two sheets of fabric.
Figure 17:
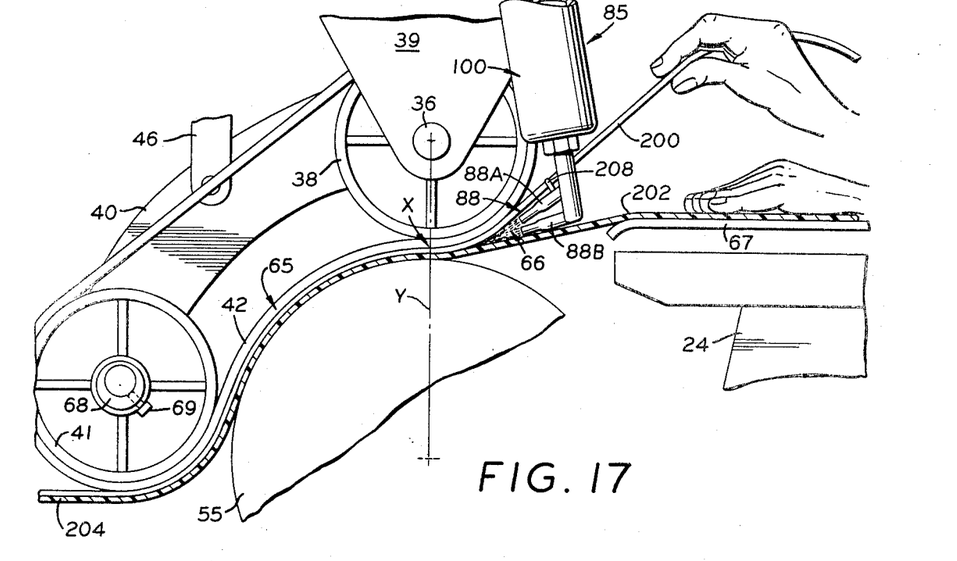
FIG. 17 is an enlarged cross section taken substantially on line 17—17 of FIG. 16 depicting the gripping and heating elements together with the operator's hands in side elevation; and, FIG. 18 is a view similar to FIG. 17 depicting two layers of fabric being welded together by an inserted thermoplastic strip.

In the representations in FIGS. 16 and 17, apparatus 10 is depicted as welding a seam joining two large pieces of fabric into a tarpaulin. One sheet 200 is supported on a table 201 positioned longitudinally of the tracks 18 and 19 in the clevis-like opening between the base and bridging frame members 11 and 13, respectively. Another fabric sheet 202 is supported on a rack 203 parallel to, and spaced outwardly of, the track 18. With the sheets thus positioned the adjacent edges of the sheets 200 and 202 may be joined by an overlapping seam 204. Tests have shown that for an eighteen ounce fabric of vinyl coated nylon a 1½" overlap seam made by the subject welding apparatus is as strong as, if not stronger than, the fabric itself.

The operator positions the apparatus 10 in proximity to one end of the track means 18 and 19 so that the edge of the sheet 202 which will form a part of the seam can be laid over the upwardly facing portion of the periphery of control drum 55 and out over guide plate 67. An annular guide line 205 (FIG. 15) is preferably provided on the circumference of drum 55 which is longitudinally aligned with a similar guide line 206 on the plate 67. When the edge of the fabric sheet 202 is coincident with these guide lines it is then properly aligned with the direction in which the apparatus will move during the welding operation.

The edge of the other sheet 200 is then placed in proper overlapping relation with the edge of sheet 202 on top of the drum 55 and guide plate 67. With the edges of the two sheets thus positioned the operator will touch the switch 169 with his foot. Switch 169 actuates the servo-mechanism shown and described in conjunction with FIG. 14 to move the control drum 55 toward the belt means 42. The pneumatic pressure in the cylinder 60 which holds the drum 55 in operative position against the belt 42 is adjusted in balance with the position and tension control of the second pulley 41 so that the extent of the nip 65 and the opposing downward force of the belt 42 is sufficient firmly to grip and hold the overlapping edges of the sheets 200 and 202.

With the edges of the fabric sheets 200 and 202 thus secured in the nip, the operator will manually grasp the edge of sheet 200 (FIG. 17) forwardly of the nip 65 and raise the edge so that the edges of the sheets separate at the bight 66. Electric switch 148 is then touched by the operator's foot to actuate the servo-mechanism which moves the guns 85 and 86 into operative position. Whatever necessary adjustment is made so that the upwardly directed prewarming orifices 96 on the uppermost heating tip 88A are directed against the undersurface of the edge of the upper sheet 200 with the muzzle 93 aimed into the bight 66. The downwardly directed prewarming orifices 96 on the lowermost heating tip 88B are directed against the upper surface of the edge of the lower sheet 202 similarly aimed into the with the muzzle 93 aimed into the bight. The two vertically aligned heating tips 88A and 88B are spaced vertically apart sufficiently so that the operator can unimpairedly observe the bight 66 by looking between the tips 88A and 88B.

With the heating elements 130 in each gun 85 and 86, together with the volumetric output of the blower 141, regulated to deliver air out of the guns at the desired heat, the operator is ready to weld.

Continuing the example of the eighteen ounce vinyl coated nylon fabric, one will know that vinyl fluxes, or puddles, for welding at about 360° F. Experience has taught that for such a material a blower pressure of 1½ to 2 pounds per square inch and with the pyrometers 133 and 134 indicating an air temperature in the throat of the compartment 125 where it joins the elbow conduit 99 at about 900°, even with a loss in air temperature on the order of 100° as it passes from the heating chamber 125 to the muzzle 93, will provide sufficient welding heat into the bight 66 so that the aforesaid 1½" seam can be welded at the rate of between four to six lineal yards per minute.

The operator maintains the edge of the lower sheet 202 on the guide line 206 with one hand and the edge of the upper sheet 200 against a guide 208, adjustably mounted on the upper heating tip 88A, with his other hand. Both hands will apply some tension to the respective sheets held thereby so that the material enters the nip without any creases or folds.

As the operator watches the bight 66 with the guns 85 and 86 both emitting hot air, he will observe that the vinyl begins to puddle at that point. With the polarity reversing switches 80 and 81 thrown to move the apparatus 10 forwardly (i.e., the operator on seat 26 moves backwards) the operator actuates the foot pedal 78 so that the motors 31 and 70 cause the apparatus so to move. The operator regulates the pressure he applies to the foot pedal 78, and hence the speed with which the belt 42, opposed drum 55 and the frame of the apparatus 10 moves along the tracks 18 and 19, so that the puddle of fluxed vinyl at the bight does not get too big (which would result in an overheating of the material) or disappear (which would result in at least a weakened weld at that point and possibly no weld at all).

Experience will permit the operator to allow the puddle to get just big enough so that some of the liquefied vinyl will flow just past the edge of the seam and seal any ends of the nylon which are exposed along the edge of the fabric at the seam.

As the overlapping edges of the sheets 200 and 202 are pulled into the nip 65, the opposing pressures of the belt 42 and control drum 55 maintain the edges in forced contact throughout the extent of the nip. It should be noted that the most satisfactory results occur when the first pulley 38 and drum 55 are positioned so that they oppose each other to provide the greatest application of pressure at a point along a line Y joining their respective centers of rotation. Thus, at point X the fabric enters the nip 65 generally tangentially with respect to both the pulley 38 and the drum 55 and under the maximum available pressure. The effect of such an orientation can be readily appreciated when contemplating welding two pieces of rough textured, or embossed, non-thermoplastic fabric which is covered with only a very thin layer of thermoplastic bonding material—for example, on the order of a one-half mil thickness.

Because the guns 85 and 86 heat only the contacting surfaces along the seam and not the entire fabric, the temperature of the vinyl will quickly fall below the fluxing temperature within the nip to form a firm weld between the fabrics. This also permits the welding of only selected layers of fabric when a plurality of layers may be required to enter the nip. An example of this would be when welding overlapping edges of a single piece of fabric folded back on itself so that the three layers thus formed can be passed through the welding machine with only the two layers comprising the overlapping edges being welded to produce a tubular construction.

Figure 15:
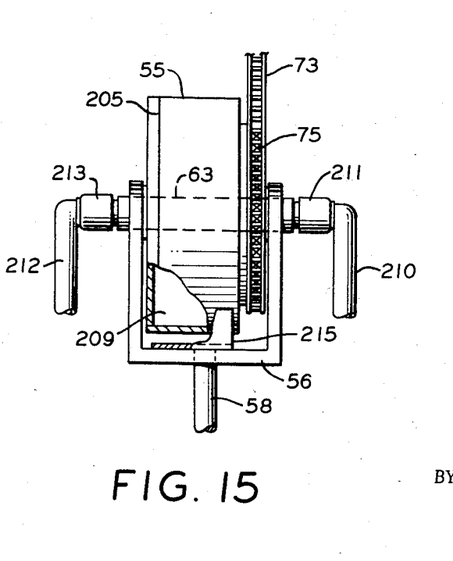
FIG. 15 is a fragmentary rear elevation, partly broken away, taken substantially on line 15—15 of FIG. 4.

If, however, for any given installation the thermoplastic bonding material does not cool sufficiently to join the fabrics, the control drum 55 may be constructed to circulate a coolant in proximity to the periphery thereof. One such arrangement is shown in FIG. 15 wherein the drum 55 is provided with a hollow core 209 fed by the hollow shaft 63 on which it is nonrotatably mounted. One end of the shaft 63 is attached to a coolant supply line 210 through a slip joint coupling 211, and the other end of the shaft 63 is attached to a discharge line 212 through a similar slip joint coupling 213. The coolant may be refrigerated and circulated by means well-known to the art and accordingly not shown.

For the best results it is wise to mark off lineal increments along the edges of both sheets 200 and 202. For example, marks 214 could be made every yard on both edges and so spaced that the marks on each edge would come together as the edges of the two sheets entered the nip. In this way the operator can readily observe whether or not one or the other of the sheets is entering the nip faster than the other.

The surfaces of both the belt and the drum which contact the fabric sheets are roughened to provide a suitable frictional contact against the fabric. However, one of the elements forming the nip may operate more efficiently, or the operator may inadvertently apply sufficiently more tension to one of the sheets than the other as he guides them into the bight so that the edges of the two sheets do not enter the nip at the same rate. If the sheets have been supplied with incremental marks the differential movement will be immediately observed, and the operator can adjust the relative speeds of the control drum 55 with respect to the belt means 42 by, in the embodiment disclosed, varying the speed of motor 70 through the manual field strength control 79 (FIGS. 1 and 11).

The resulting differential surface speeds of the belt 42 and control drum 55 immediately compensate for any of the host of factors which will cause the fabrics to be fed into the nip at different rates.

As the seam leaves the nip the weight of the joined fabric will cause it to disengage from the belt 42, and the extent of the joined seam will generally assure that the fabric will also leave the control drum 55. However, in the event that the seam adheres to the drum 55 a flexible scraper 215 (FIG. 5) mounted on the fork 56 and extending upwardly therefrom, contacts the peripheral outer surface of the drum 55 below the maximum extent of the nip 65 to force the fabric away therefrom.

If, for any reason, the operator desires to stop welding at any point along the seam, he need merely release his foot pressure from pedal 78 and both motors 31 and 70 will stop. This stops the belt 42, the drum 55 and the movement of the frame of the apparatus 10 along the tracks 18 and 19. At such a time it is imperative that the guns 85 and 86 immediately cease heating the fabric or irreparable injury could be done not only to the thermoplastic covering but also to the base material. Merely to turn off the heating element and/or the blower has been found, in some situations, to be ineffectually slow because of the residual heat. Accordingly, in a welding apparatus constructed according to the applicant's concept the operator need merely again touch switch 148 with his foot, and the guns will be swung outwardly of the bight 66 by the extension of piston rod 106. The rotation of the rod 106 near the end of the outermost extent of its stroke, effected by the interaction of the cam follower 114 and the helical portion 118 of cam 115, swings the aim of the muzzles 93 of the guns 85 and 86 in a generally upwardly direction away from both fabric sheets 200 and 202.

Should the operator desire to reverse the direction of travel of the apparatus 10 without releasing the fabric from the nip, he need only throw the reverse polarity switches 80 and 81 and not only the apparatus 10 but also both the belt 42 and control drum 55 will coordinately reverse their direction of travel upon depression of pedal 78.

With this general background it is readily understandable that the occasion may arise where only one heating tip 88 would be utilized. For example, if one desired to hem a material by merely turning back an edge, one heating tip could be utilized which was provided with prewarming orifices 96 directed outwardly from both flat sides 91 and 92 of the tip 88.

Figure 18:
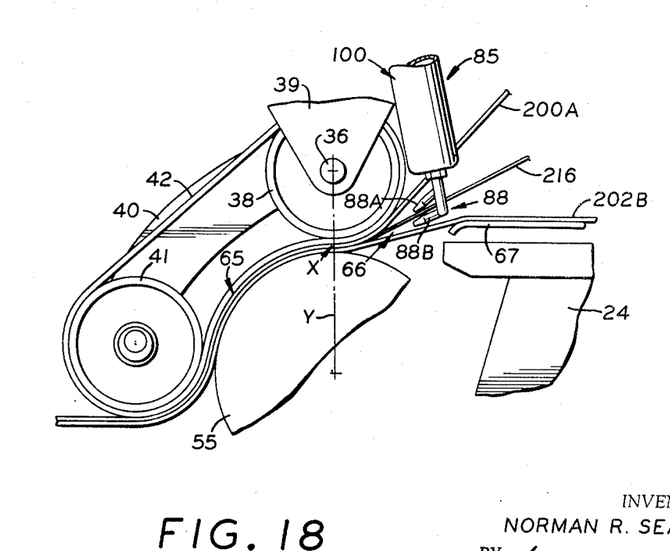

Another adaptation would be to utilize two tips oriented as shown in the preferred embodiment but have the tips 88A and 88B provided with prewarming orifices 96 through both sides 90 and 91 of each tip 88A and 88B. With such an arrangement two pieces of fabric could be welded together although, neither of which was provided with a thermoplastic covering. As shown schematically in FIG. 18 a thermoplastic bonding strip 216 would be fed between the tips 88A and 88B and into the bight 66. By such an arrangement the prewarming orifices 96 in tip 88A would warm the under surface of the upper sheets 200A and the upper surface of the bonding strip 216, and, at the same time, the prewarming orifices in the tip 88B would warm the upper surface of the lower sheet 202B and the under surface of the bonding strip 216. As the three components (sheets 200A and 202B and strip 216) enter the nip the main hot air blast from the muzzle 93 in tip 88A would join the sheet 200A to the strip 216 and the main hot air blast from the muzzle 93 in tip 88B would join the sheet 202B to the strip 216. Thus, the two sheets, even though themselves not thermoplastically coated, could be welded together.

It should, therefore, be apparent that a welding apparatus constructed according to the concept of the present invention is extremely versatile, and, because the hot air jet heats only the surface of the fabric being welded, the welding process is not affected by the thickness of either the fabric or the thermoplastic coating. Moreover, because the heat need only bring the surface of the fabric to welding temperature, it makes no difference whether or not any of the various fillers are included in the hermoplastic coating as the surface will not char nor will the weld be adversely affected by the hydroscopic nature of the base of the fabric. Thus, not only the uniformity of the weld and the speed with which it is accomplished, as provided by such a welding apparatus, but also the accomplishment of the various other objects of the invention will be immediately apparent to one skilled in the art.

What is claimed is:

1. A method for welding together layers of thermoplastically coated fabric in a seam comprising the steps of, positioning the edges of the fabric to be joined in overlapping relation, gripping a portion of the overlapping layers in an extended nip, forming a bight between the layers of fabric extending outwardly from one end of the nip, directing heated air into said bight until a puddle of thermoplastic material forms therein, moving said layers into said nip at a rate sufficient to maintain a puddle at said bight, selectively controlling the speed at which each layer of fabric is moved into said nip, maintaining said layers within said nip until said thermoplastic material cools below its puddling temperature.

2. A method for welding together layers of fabric in a seam with a thermoplastic bond comprising the steps of, positioning the edges of the fabric to be joined in overlapping relation with a strip of thermoplastic bonding material inserted therebetween, gripping a portion of the overlapping layers in an extended nip with a bight at one end thereof, directing heated air into said bight so that the thermoplastic bonding material puddles against both of the overlapping layers, moving said layers into said nip at a rate sufficient to maintain said puddles, maintaining said layers within said nip until said bonding material cools below its puddling temperature.

3. A machine for welding together layers of fabric along a seam with a thermoplastic bond comprising, a frame, an extended nip having a bight at at least one end thereof, opposed gripping means carried on said frame and forming said nip through which the layers of fabric to be welded are moved, drive means to power said gripping means along the extent of said nip and carry the fabric therewith, control means for independently regulating the speed at which the gripping means on one side of said nip move with respect to the gripping means on the other side of said nip, at least one heat gun, said heat gun operative to direct heated air into said bight between the layers of fabric entering said nip.

4. A machine for welding fabric, as set forth in claim 3, in which said air gun has an intake conduit, a flattened barrel portion communicating with said intake conduit and terminating in a muzzle, a guide block positioned in said barrel portion between said muzzle and said intake conduit, a plurality of bores through said guide block oriented parallel to the longitudinal axis of said barrel portion, a plurality of prewarming orifices on at least one side of said flattened barrel portion between said guide block and said intake conduit.

5. A machine for welding fabrics, as set forth in claim 3, in which the frame is movable along a track means and said drive means are selectively operable to power said frame therealong at a rate coordinated with the speed with which said contact surfaces traverse said nip.

6. A machine for welding layers of fabric together in a seam with a thermoplastic bond comprising, a frame, gripping means carried on said frame and having vertically opposed continuous contact surfaces, biasing means urging the first of said contact surfaces toward the second contact surface, pressure means selectively to move the second of said contact surfaces toward and away from said first contact surface, an extended nip being formed between said opposed contact surfaces with a bight at at least one end thereof when said contact surfaces are moved toward each other, first drive means to move the first of said contact surfaces along said nip and separate second drive means to move the second of said contact surfaces along said nip and carry the fabric therewith, control means for independently regulating the speed at which one of said drive means moves one of said contact surfaces along said nip with respect to the other of said contact surfaces, at least one heat gun, said heat gun operative to direct heated air into said bight.

7. A machine for welding fabric with a thermoplastic bond comprising, a frame, a control drum rotatably mounted on said frame, drive means for rotating said drum at selected speeds, first and second pulley means, an endless belt means reeved around said first and second pulley means in opposition to said control drum, separate drive means connected to said first pulley means for rotation of said belt means, adjustable positioning means for biasing said second pulley means toward said drum means, means for moving said control drum and said belt means into and out of contact, an extended nip formed by said belt means around a portion of the periphery of said control drum terminating in a bight when said belt means is in contact with said control drum, an air gun, said air gun operative to direct heated air into said bight.

8. A machine for welding fabric as set forth in claim 7, in which said air gun has a pair of intake conduits, a flattened barrel portion communicating with and extending laterally from one end of each said intake conduit and terminating in a muzzle, said barrel portions being positioned one above the other to form upper and lower barrels, means for supplying heated air connected to the other end of each intake conduit, each said barrel portion having a guide block positioned therein between said muzzle and said intake conduit, a plurality of bores through each said guide block oriented parallel to the longitudinal axis of the barrel portion in which said block is received, a plurality of prewarming orifices through at least one flattened side of each said barrel portion.

9. A machine for welding fabric as set forth in claim 8, in which there are a plurality of prewarming orifices directed upwardly from said upper barrel and a plurality of prewarming orifices directed downwardly from said lower barrel.

10. A machine for welding fabric with a thermoplastic bond comprising, a frame, wheels supporting said frame, a first power means connected selectively to drive said wheels and move said frame in response thereto, an endless belt means rotatably supported on said frame, said first power means connected to rotate said belt means in coordination with the movement of said frame, a control drum rotatably mounted on said frame in opposition to said belt means, means to move said control drum toward and away from said belt means, an extended nip formed by said belt means around a portion of the periphery of said control drum and terminating in a bight when said control drum is in contact with said belt means, a second power means to rotate said control drum, means selectively to regulate the rotational speed of said control drum with respect to the rotational speed of said belt means, and at least one air gun mounted on said frame and operative to direct heated air into said bight.

11. A machine for welding a fabric with a thermoplastic bond comprising, a frame, a control drum rotatably mounted on said frame, drive means for rotating said drum at selected speeds, a belt means supported on said frame in opposition to said control drum, separate drive means for rotating said belt means, means for moving said control drum and said belt means into and out of contact, an extended nip formed by said belt means around a portion of the periphery of said control drum terminating in a bight when said belt means is in contact with said control drum, a control cylinder for extending and retracting a piston rod, a mounting block carried on said rod, at least one heat gun mounted in said block, a heating tip on said gun directed into said bight when said rod is retracted, said heating tip being directed away from said bight when said rod is extended.

12. A machine for welding fabric with a thermoplastic bond comprising, a track means, a frame supported by wheel means carried on said track means, a first power means on said frame connected selectively to rotate said wheel means, a belt means supported on said frame and oriented generally in alignment with said track means, said belt means rotatable by said first power means with the surface speed thereof being coordinated with the speed of said frame along said track means, a control drum rotatably mounted on said frame in opposition to said belt means, second power means on said frame for rotating said control drum, control means for regulating the surface speed of said control drum with respect to the surface speed of said belt means, means for moving said control drum and said belt means into and out of contact, an extended nip formed by said belt means around a portion of the periphery of said control drum terminating in a bight when said belt means is in contact with said control drum, an air gun, said air gun operative to direct heated air into said bight.

References Cited

UNITED STATES PATENTS

| | | | |
|---|---|---|---|
| 2,220,545 | 11/1940 | Reinhardt | 156—304 |
| 2,367,725 | 1/1945 | Lindh et al. | 156—304 |
| 2,538,520 | 1/1951 | Holt et al. | 156—497 XR |
| 3,057,766 | 10/1962 | Dickey | 156—497 XR |
| 3,231,655 | 1/1966 | Larsen | 156—497 XR |
| 2,224,370 | 12/1940 | Wescott | 156—498 XR |
| 3,075,868 | 1/1963 | Long | 156—282 XR |
| 3,142,331 | 7/1964 | Dierks | 239—132.3 |

EARL M. BERGERT, *Primary Examiner.*

E. F. EPSTEIN, *Assistant Examiner.*